(12) United States Patent
Lim

(10) Patent No.: US 7,717,609 B2
(45) Date of Patent: May 18, 2010

(54) DIGITAL VIDEO RECORDING APPARATUS AND EDITING METHOD FOR RECORDED BROADCAST PROGRAMS

(75) Inventor: Dae Young Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 1035 days.

(21) Appl. No.: 11/320,815

(22) Filed: Dec. 30, 2005

(65) Prior Publication Data

US 2006/0159422 A1    Jul. 20, 2006

(30) Foreign Application Priority Data

Jan. 19, 2005   (KR) .................... 10-2005-0004902

(51) Int. Cl.
*H04N 5/91* (2006.01)
*H04N 5/93* (2006.01)
(52) U.S. Cl. .......................................... 366/83; 386/52
(58) Field of Classification Search ................... 386/83, 386/46, 52, 55, 121, 124
See application file for complete search history.

(56) References Cited

U.S. PATENT DOCUMENTS

2004/0078818 A1 *  4/2004  Hong ........................... 725/58
2006/0098955 A1 *  5/2006  Nakada ....................... 386/124

FOREIGN PATENT DOCUMENTS

KR    10-2004-0035112 A1    4/2004

* cited by examiner

*Primary Examiner*—Robert Chevalier
(74) *Attorney, Agent, or Firm*—Birch, Stewart, Kolasch & Birch, LLP

(57) ABSTRACT

A digital video recording apparatus and an editing method for recorded broadcast programs are disclosed. In accordance with the disclosed apparatus and method, information of recorded broadcast programs is extracted from a broadcast stream which includes the broadcast programs. The extracted information is displayed on a display in the form of a program record list. Accordingly, the user can easily edit recorded broadcast programs by simply editing the program record list.

13 Claims, 3 Drawing Sheets

FIG. 2

| | | | |
|---|---|---|---|
| ☐ | CNN News<br>sun,May 15　　09:00pm<br>(3hours) | CNN News<br>09:00 pm ~ 09:30 pm (30min) | —202 |
| ☐ | Baseball<br>Mon,May 16　　06:00am<br>(1hour 30min) | Finding Nimo..　　　　　◉<br>09:30 pm ~ 11:50 pm (2hour 20min) | —203 |
| ☐ | Program1 | Hollywood News<br>11:50 pm ~ 12:00 am (10min) | —204 |
| ☐ | Program2 | | |
| ☐ | Program3 | | |
| ☐ | Program4 | | |

201

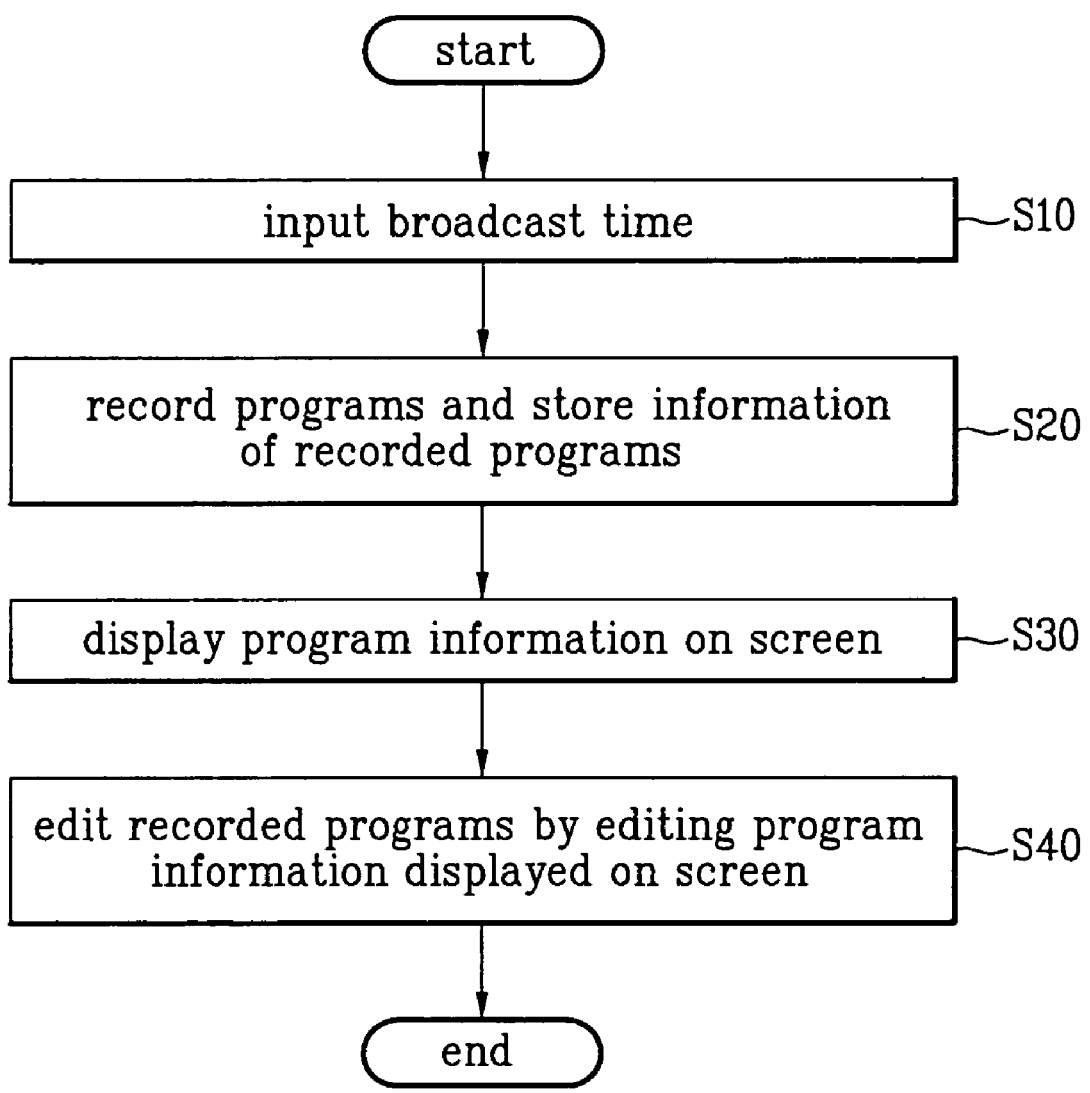

ary, it is necessary to previ-
DIGITAL VIDEO RECORDING APPARATUS AND EDITING METHOD FOR RECORDED BROADCAST PROGRAMS This application claims the benefit of Korean Patent Application No. 10-2005-0004902, filed on Jan. 19, 2005, which is hereby incorporated by reference as if fully set forth herein.

BACKGROUND OF THE INVENTION

1. Field of the Invention

The present invention relates to a digital video recording apparatus and an editing method for recorded broadcast programs, and more particularly, to a digital video recording apparatus and an editing method for recorded broadcast programs which are capable of easily editing recorded programs.

2. Discussion of the Related Art

Personal video recorders (PVRs) and digital video recorders (DVRs) are products developed to record digital media. A storage device such as a hard disk drive (HDD) is internally equipped in such recorders. Since such recorders can record a broadcast program after digitizing the broadcast program, there is no degradation in picture quality when the recorded broadcast program is played back. Also, since the recorders have a time shift function or a playback function, it is possible to play back the recorded broadcast program whenever the user desires to view the recorded broadcast program.

Hereinafter, such a recorder is referred to as a digital broadcast recorder which can store a broadcast program after digitizing the broadcast program, and can play back the stored program in accordance with a time shift function or a playback function.

Digital broadcast recorders, which are currently available, are internally equipped with a large-capacity storage device capable of recording a large amount of HD-grade programs or SD-grade programs corresponding to a playback amount of several tens of hours. Traditional tape recorders such as video tape recorders (VTRs) have various problems generated during recording of data on a recording tape and reproduction of the recorded data in association with the recording and reproduction quality of the data due to defects of the recording tape or a VTR header. In digital broadcast recorders, however, there is no degradation in picture quality when a recorded broadcast program is played back. This is because the broadcast program is recorded in the form of a digitalized broadcast stream.

Recording of multimedia in a digital recorder may be carried out in diverse modes. For example, there is a method in which the user selects an immediate recording function of the digital recorder. Hereinafter, this method will be referred to as an "immediate-recording mode".

Also, there is an "automatic reserved-recording method" in which a program is automatically reserved-recorded, based on the time information of the program obtained from broadcast information such as an electronic program guide (EPG). Hereinafter, this method will be referred to as an "automatic reserved-recording mode".

Another method is a "manual reserved-recording" method in which the user manually inputs a reserved-recording time in order to enable reserved-recording of a program at the reserved-recording time. Hereinafter, this method will be referred to as a "manual reserved-recording mode".

Of the above-mentioned modes, the "automatic reserved-recording mode" would be most convenient. In the automatic reserved-recording mode, however, it is necessary to previously obtain broadcast information using an EPG. Generally, broadcast information, which is included in a broadcast stream, is supplied in an amount of only about one week, even though the amount of broadcast information depends on the broadcast transmission system used to transmit the broadcast stream. For this reason, the "immediate-recording mode" or "manual reserved-recording" mode is mainly used.

In the "manual reserved-recording" mode, a broadcast program is recorded based on broadcast schedule time information. In this case, however, it is necessary to input, to the digital broadcast recorder, a desired reserved-recording time identified from the broadcast schedule time information which may be obtained from a newspaper or on the Internet. Furthermore, a broadcast program other than a desired broadcast program may be recorded when the broadcast schedule time information is incorrect.

Also, if the user cannot identify a correct broadcasting time of a broadcast program to be reserved-recorded, the reserved-recording time span for the broadcast program must be sufficiently lengthened in order to secure the broadcasting time span of the broadcast program to be within the lengthened reserved-recording time span. In this case, the user must subsequently edit the recorded data to delete an unnecessary portion of the recorded data while maintaining the program desired to be recorded.

A substantial time is taken to perform the editing procedure even though the time depends on the skill of the user. In addition, the user may erroneously delete a portion of the broadcast program which the user desires to view.

SUMMARY OF THE INVENTION

Accordingly, the present invention is directed to a digital video recording apparatus and an editing method for recorded broadcast programs that substantially obviate one or more problems due to limitations and disadvantages of the related art.

An object of the present invention is to provide a digital video recording apparatus and an editing method for recorded broadcast programs which are capable of easily editing recorded programs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an editing method for recorded broadcast programs comprises the steps of: (a) receiving a roughly-estimated broadcasting time of a broadcast program to be recorded; (b) recording a broadcast stream received from the broadcasting time, extracting information about broadcast programs included in the recorded broadcast stream, and storing the extracted broadcast program information; (c) displaying the stored broadcast program information on a screen; and (d) editing the recorded broadcast programs using the displayed broadcast program information.

The broadcast program information at the step (b) may include at least one of program title information and program broadcasting time information included in the broadcast stream.

The broadcast program information may be extracted from an event information table (EIT) of the broadcast stream if the broadcast stream is transmitted in accordance with an Advanced Television System Committee (ATSC) broadcast transmission system or a digital cable broadcasting system.

The broadcast program information may be extracted from a schedule object or a program object of the broadcast stream if the broadcast stream is transmitted in accordance with a DIRECTV advanced program guide (APG) broadcast transmission system.

The information displayed on the screen at the step (c) may include a list of the recorded programs.

The recorded broadcast programs may be edited at the step (d) by editing the broadcast program information displayed on the screen.

The editing method may further comprise the step of, when an editing operation to delete information of an unnecessary one of the recorded broadcast programs is carried out to delete the unnecessary broadcast program, displaying a message identifying whether or not the information should be deleted, prior to the deletion of the program, to allow a user to finally determine the deletion of the program.

In another aspect of the present invention, a digital broadcast recording apparatus comprises: a tuner which receives broadcast streams, and selects a broadcast stream of a desired channel from the received broadcast streams; a first memory which stores the broadcast stream; and a control unit which extracts information of the recorded broadcast programs from the broadcast stream stored in the first memory, and displays the extracted broadcast program information.

The control unit may include a control signal receiver which receives a control signal input by a user, a second memory which extracts the information of the recorded broadcast programs, and stores the extracted broadcast program information, and a central controller which displays the broadcast program information stored in the second memory.

The central controller may delete an unnecessary one of the recorded broadcast programs in response to a deletion of broadcast program information associated with the unnecessary broadcast program executed by a user.

The information of the recorded broadcast programs may be displayed in the form of a program record list.

When a user deletes broadcast program information associated with an unnecessary one of the recorded broadcast programs, the central controller may update the program record list, and may display the updated program record list on the display.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a schematic diagram illustrating an example of a list of recorded programs, which may be produced in an editing method for recorded broadcast programs according to the present invention; and FIG. 3 is a flow chart illustrating an exemplary embodiment of the editing method for recorded broadcast programs according to the present invention.

DETAILED DESCRIPTION OF THE INVENTION

Figure 1:
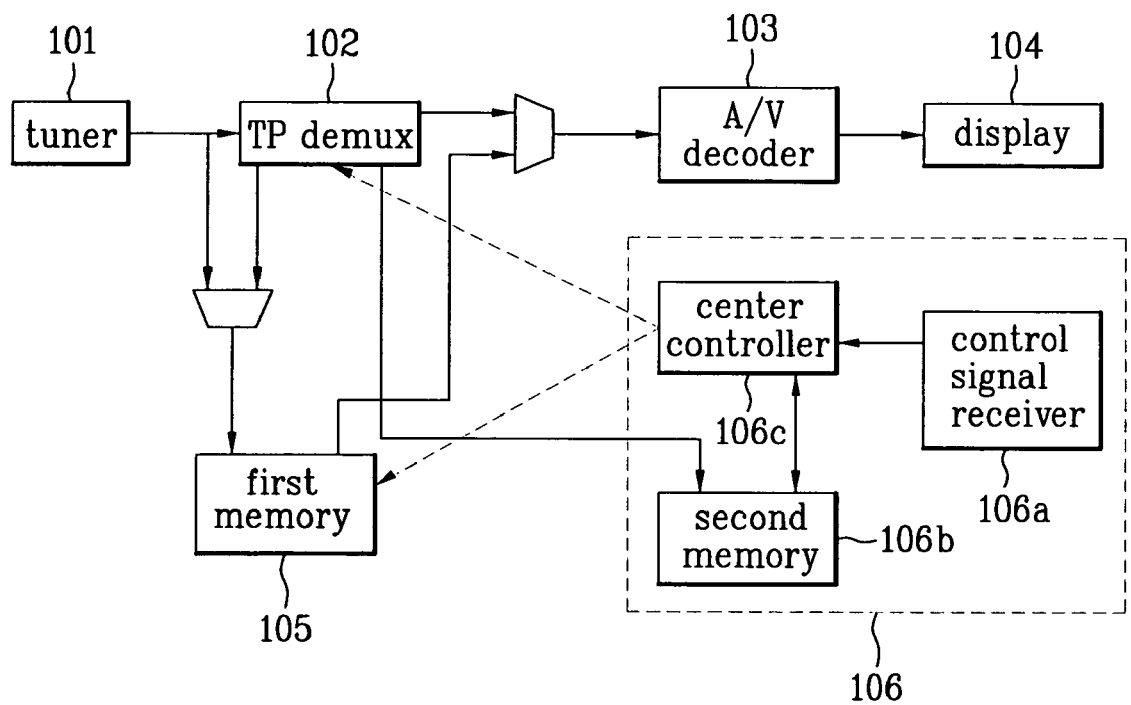
FIG. 1 is a block diagram illustrating a digital video recording apparatus according to an exemplary embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

FIG. 1 is a block diagram illustrating a digital video recording apparatus according to an exemplary embodiment of the present invention.

The digital video recording apparatus according the illustrated exemplary embodiment of the present invention includes a tuner 101, a demultiplexer (DEMUX) 102, a decoder 103, for example, an audio/video (A/V) decoder, a display 104, a first memory 105, and a control unit 106.

The tuner 101 receives radio-frequency (RF) broadcast signals, and selects a broadcast signal of a desired channel from the received RF broadcast signals. The DEMUX 102 extracts a transport stream from the selected broadcast signal.

The decoder 103 converts the extracted transport stream to video and audio signals. The display 104 receives the video and audio signals from the decoder 103, and externally outputs the video and audio signals in the form of a video image and sound.

The first memory 105 stores the transport stream of the broadcast signal of the selected channel.

The control unit 106 includes a control signal receiver 106a, a second memory 106b, and a central controller 106c. The control signal receiver 106a receives a control signal input by the user, and outputs the received control signal to the central controller 106c, so as to cause the central controller 106c to execute a user command according to the control signal. The second memory 106b stores broadcast stream information which is included in the transport stream of the selected channel.

The central controller 106c controls the first memory 105 and DEMUX 102 in accordance with the user command, to cause the first memory 105 to store the transport stream of the selected channel, or to cause the DEMUX 102 to send the transport stream to the decoder 103, and thus, to cause the decoder 103 to externally output a broadcast program of the transport stream.

Thus, the control unit 106 can store information about a broadcast stream to be stored, and information about a program to be stored. The control unit 106 can also produce a list of recorded programs, using recorded or received program information.

The central controller 106c can extract broadcast information from the broadcast stream stored in the first memory 105. The broadcast information may be program information including the title and length of an associated program. Also, the central controller 106c can produce a list of recorded programs having a certain format, using extracted broadcast information, and can control the display 104 to display the program list in accordance with a selection by the user.

The program information may be extracted from an event information table (EIT) in the case of an Advanced Television System Committee (ATSC) broadcast transmission system or a digital cable broadcasting system, or from a schedule object or program object in the case of a DIRECTV advanced program guide (APG) broadcast transmission system. Thus, the program information may be extracted from diverse sources in accordance with different broadcast transmission systems used to transmit broadcast streams. Also, the program information may be any information, so long as programs included in a broadcast stream can be identified based on the information.

In accordance with another embodiment of the present invention, the digital broadcast recording apparatus may dispense with the second memory 106b which is included in the control unit 106 in the illustrated embodiment of the present invention. In this case, the broadcast program information, which is stored in the second memory 106 in the illustrated embodiment of the present invention, may be stored in the first memory 105. Also, the central controller 106c may produce a list of recorded programs, using the broadcast program information stored in the first memory 105.

FIG. 2 illustrates an example in which a list of recorded programs, which may be produced in accordance with the digital broadcast recording apparatus and the editing method for recorded broadcast programs, is displayed on a screen.

In the example of FIG. 2, it is assumed that a recording operation was carried out for three hours from 09:00 pm because the user could not identify a correct broadcasting time of a movie entitled "Finding Nimo" to be recorded, and as a result, programs entitled "CNN News", "Finding Nimo", and "Hollywood News" were recorded.

In the example of FIG. 2, a record list 201 entitled "CNN News" is produced. Referring to FIG. 2, it can be seen that the record list 201 includes record items, namely, a "CNN News" record item 202, a Finding Nimo" record item 203, and a "Hollywood News" record item 204.

In this case, the user can delete the unnecessarily-recorded programs by deleting the record items 202 and 204 from the "CNN News" record list 201 while maintaining the "Finding Nimo" record item 203 desired by the user in the "CNN News" record list 201.

When the user executes a procedure for deleting desired record items from the record list, a corresponding delete command is input to the control unit 106. In response to the delete command, the controller 106 deletes associated recorded programs from the first memory 105. Thus, editing of the recorded programs can be easily carried out by simply deleting unnecessary record items from the record list while maintaining desired record items in the record list.

FIG. 3 is a flow chart illustrating an exemplary embodiment of the editing method for recorded broadcast programs according to the present invention. Hereinafter, the editing method for recorded broadcast programs according to the present invention will be described with reference to FIG. 3.

First, the user inputs a roughly-estimated broadcasting time of a program to be recorded (S10). From the input broadcasting time, recording of a broadcast stream is executed. The broadcast information of the recorded broadcast stream is extracted from the recorded broadcast stream, and is then stored (S20).

The stored broadcast information is then displayed on a screen (S30). Using the displayed broadcast information, the user edits desired programs of the recorded broadcast stream (S40).

The broadcast information of the recorded broadcast stream at step S20 may include the titles of the recorded programs.

When the broadcast information of the broadcast stream is displayed at step S30, it is preferred that the broadcast information be provided to the user in the form of a list of recorded programs.

The program editing at step S40 may be carried out in such a manner that, when unnecessary program information is deleted from the displayed broadcast information, the stored program associated with the deleted program information is automatically deleted. When a stored program is about to be deleted, a message identifying whether or not the stored program should be deleted may be displayed, prior to the deletion of the program, to allow the user to finally determine the deletion of the program.

As apparent from the above description, the editing method for recorded broadcast programs according to the present invention enables the user to easily edit broadcast programs recorded in accordance with a selection by the user, using broadcast information about the recorded broadcast programs. Accordingly, it is possible to eliminate errors occurring in the editing procedure carried out by the user, and to enable the user to easily edit the recorded data.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An editing method for recorded broadcast programs, comprising the steps of:
    (a) receiving from a user a broadcasting starting time and broadcasting ending time of a broadcast program to be recorded;
    (b) recording a broadcast stream received between the broadcasting starting time and the broadcasting ending time, extracting broadcast program information about at least one broadcast program included in the recorded broadcast stream, and storing the extracted broadcast program information;
    (c) displaying the stored broadcast program information on a screen;
    (d) editing the stored broadcast program information on the screen; and
    (e) maintaining a portion of the recorded broadcast stream corresponding to the broadcast program to be recorded, and deleting a portion of the recorded broadcast stream corresponding to another of the at least one broadcast program not to be recorded.

2. The editing method according to claim 1, wherein the broadcast program information includes at least one of program title information and program broadcasting time information.

3. The editing method according to claim 2, wherein the step of extracting broadcast program information comprises:
    extracting the broadcast program information from an event information table (EIT) if the broadcast stream is transmitted in accordance with an Advanced Television System Committee (ATSC) broadcast transmission system or in accordance with a digital cable broadcasting system.

4. The editing method according to claim 2, wherein the step of extracting broadcast program information comprises:
    extracting the broadcast program information from a schedule object or a program object if the broadcast stream is transmitted in accordance with a DIRECTV advanced program guide (APG) broadcast transmission system.

5. The editing method according to claim 1, wherein the step of displaying the stored broadcast program information comprises:
    displaying a list of the at least broadcast program included in the recorded broadcast stream.

6. The editing method according to claim 1, wherein the step of displaying further comprises:
  displaying a message prompting the user to decide whether or not the another of the at least broadcast program should be deleted.

7. A digital broadcast recording apparatus, comprising:
  a tuner configured to receive broadcast streams, and select a broadcast stream of a desired channel from the received broadcast streams;
  a first memory configured to store the broadcast stream between a user-provided broadcasting starting time and broadcasting ending time; and
  a controller configured to
    receive from a user the broadcasting starting time and the broadcasting ending time of a broadcast program to be recorded,
    extract broadcast program information about at least broadcast program included in the stored broadcast stream,
    display the extracted broadcast program information,
    edit the stored broadcast program information on the screen, and
    maintain a portion of the recorded broadcast stream corresponding to the broadcast program to be recorded, and delete a portion of the recorded broadcast stream corresponding to another of the at least one broadcast program not to be recorded.

8. The digital broadcast recording apparatus according to claim 7, wherein the controller includes:
  a control signal receiver configured to receives the broadcasting starting time and the broadcasting ending time from the user;
  a second memory configured to extract the broadcast program information and store the extracted broadcast program information; and
  a central controller configured to display the broadcast program information stored in the second memory.

9. The digital broadcast recording apparatus according to claim 7, wherein the central controller is configured to delete the another of the at least broadcast program in response to a user command.

10. The digital broadcast recording apparatus according to claim 7, wherein the controller is configured to display the broadcast program information in the form of a program record list.

11. The digital broadcast recording apparatus according to claim 7, wherein the broadcast program information includes at least one of program title information and program broadcasting time information.

12. The digital broadcast recording apparatus according to claim 7, wherein the controller is configured to extract the broadcast program information from an event information table (EIT) of the broadcast stream if the broadcast stream is transmitted in accordance with an Advanced Television System Committee (ATSC) broadcast transmission system or in accordance with a digital cable broadcasting system.

13. The digital broadcast recording apparatus according to claim 7, wherein the controller is configured to extract the broadcast program information from a schedule object or a program object if the broadcast stream is transmitted in accordance with a DIRECTV advanced program guide (APG) broadcast transmission system.

* * * * *